United States Patent
Cavgun et al.

(10) Patent No.: US 12,280,728 B2
(45) Date of Patent: Apr. 22, 2025

(54) ARRANGEMENT FOR HOLDING A SIDEWALL ELEMENT ON A BODYSHELL PART OF A VEHICLE, BRACKET AND VEHICLE

(71) Applicant: Bayerische Motoren Werke Aktiengesellschaft, Munich (DE)

(72) Inventors: Serhan Cavgun, Unterschleissheim (DE); Almir Gacan, Ingolstadt (DE); Martin Riedner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 304 days.

(21) Appl. No.: 17/921,230

(22) PCT Filed: Apr. 6, 2021

(86) PCT No.: PCT/EP2021/058888
§ 371 (c)(1),
(2) Date: Oct. 25, 2022

(87) PCT Pub. No.: WO2021/223948
PCT Pub. Date: Nov. 11, 2021

(65) Prior Publication Data
US 2023/0182668 A1 Jun. 15, 2023
US 2025/0042351 A2 Feb. 6, 2025

(30) Foreign Application Priority Data
May 4, 2020 (DE) ..................... 10 2020 111 910.0

(51) Int. Cl.
*B60R 19/34* (2006.01)
*B60R 19/24* (2006.01)
(Continued)

(52) U.S. Cl.
CPC ........ *B60R 19/34* (2013.01); *B60R 2019/247* (2013.01); *B62D 25/02* (2013.01);
(Continued)

(58) Field of Classification Search
CPC ...... B62D 25/02; B62D 25/163; B62D 25/08; B62D 25/085; B62D 25/105; B62D 25/12;
(Continued)

(56) References Cited

U.S. PATENT DOCUMENTS

| 4,895,405 A | 1/1990 | Sasatake et al. |
| 7,413,239 B2* | 8/2008 | Mitsuyama .......... B62D 25/163 296/187.04 |

(Continued)

FOREIGN PATENT DOCUMENTS

| CN | 101168370 A | 4/2008 |
| CN | 201068168 Y | 6/2008 |

(Continued)

OTHER PUBLICATIONS

English translation of Chinese-language Office Action issued in Chinese Application No. 202180030965.3 dated Jun. 1, 2023 (8 pages).

(Continued)

*Primary Examiner* — Amy R Weisberg
*Assistant Examiner* — Dana D Ivey
(74) *Attorney, Agent, or Firm* — Crowell & Moring LLP

(57) ABSTRACT

An arrangement for holding a sidewall element on a bodyshell part of a bodyshell for a vehicle, in which arrangement the sidewall element is held on the bodyshell part by way of
(Continued)

a bracket which is formed separately from the bodyshell part and separately from the sidewall element. The bracket is connected to the bodyshell part and to the sidewall element, wherein the bracket has a first retaining element connected to the bodyshell part and a second retaining element, which is connected to the sidewall element and is formed separately from the first retaining element and is connected to the first retaining element.

9 Claims, 2 Drawing Sheets

(51) Int. Cl.
*B62D 25/02* (2006.01)
*B62D 25/08* (2006.01)
*B62D 25/10* (2006.01)
*B62D 25/12* (2006.01)
*B62D 25/16* (2006.01)
*B62D 27/06* (2006.01)
*F16B 5/02* (2006.01)
*F16B 21/09* (2006.01)
*F16B 37/06* (2006.01)

(52) U.S. Cl.
CPC ............ *B62D 25/08* (2013.01); *B62D 25/085* (2013.01); *B62D 25/105* (2013.01); *B62D 25/12* (2013.01); *B62D 25/163* (2013.01); *B62D 27/065* (2013.01); *F16B 5/0225* (2013.01); *F16B 21/09* (2013.01); *F16B 37/061* (2013.01)

(58) Field of Classification Search
CPC . B62D 27/065; B60R 19/34; B60R 2019/247; F16B 5/0225; F16B 21/09; F16B 37/061
USPC ...... 296/198, 193.11, 193.1, 193.02, 193.09; 293/154
See application file for complete search history.

(56) References Cited

U.S. PATENT DOCUMENTS

| | | | |
|---|---|---|---|
| 8,162,387 B1 * | 4/2012 | Nydam | ............ B62D 25/12 |
| | | | 296/193.11 |
| 2004/0032133 A1 | 2/2004 | Bird | |
| 2006/0064845 A1 | 3/2006 | Fujii et al. | |
| 2008/0100073 A1 | 5/2008 | Mitsuyama | |
| 2015/0251614 A1 | 9/2015 | Boksebeld et al. | |
| 2015/0336518 A1 | 11/2015 | Niessen et al. | |
| 2016/0221490 A1 | 8/2016 | Kandlbinder et al. | |
| 2019/0101360 A1 | 4/2019 | Stewart | |
| 2020/0332819 A1 | 10/2020 | Matthes et al. | |

FOREIGN PATENT DOCUMENTS

| | | | | |
|---|---|---|---|---|
| CN | 104276216 A | | 1/2015 | |
| CN | 206654017 U | | 11/2017 | |
| CN | 206664723 U | | 11/2017 | |
| CN | 208149449 U | | 11/2018 | |
| CN | 208439321 U | | 1/2019 | |
| CN | 209617287 U | | 11/2019 | |
| DE | 10 2009 007 700 A1 | | 8/2010 | |
| DE | 10 2017 123 424 A1 | | 4/2019 | |
| EP | 2 151 356 A1 | | 2/2010 | |
| EP | 2 946 988 A1 | | 11/2015 | |
| EP | 2 790 940 B1 | | 4/2017 | |
| GB | 2281260 A | * | 3/1995 | ............ B60R 19/24 |
| JP | 59011977 A | * | 7/1982 | |
| WO | WO 2014/064394 A2 | | 5/2014 | |
| WO | WO 2015/052343 A1 | | 4/2015 | |

OTHER PUBLICATIONS

International Search Report (PCT/ISA/210) issued in PCT Application No. PCT/EP2021/058888 dated Jun. 30, 2021 with English translation (five (5) pages).
German-language Written Opinion (PCT/ISA/237) issued in PCT Application No. PCT/EP2021/058888 dated Jun. 30, 2021 (seven (7) pages).
German-language Search Report issued in German Application No. 10 2020 111 910.0 dated Dec. 9, 2020 with partial English translation (11 pages).

* cited by examiner

ARRANGEMENT FOR HOLDING A SIDEWALL ELEMENT ON A BODYSHELL PART OF A VEHICLE, BRACKET AND VEHICLE

BACKGROUND AND SUMMARY

The invention relates to an arrangement for holding a sidewall element on a bodyshell part of a bodyshell for a vehicle, in particular for a passenger car. Furthermore, the invention relates to a bracket and also relates to a vehicle.

WO 2015/052343 A1 discloses an arrangement for holding a headlight on a front end module for a passenger car. In this case, a sidewall element is also held on the body of the passenger car, the sidewall element adjoining the headlight. Furthermore, an arrangement for holding a wing element or a paneling element on a motor vehicle body is known from EP 2 790 940 B1.

It is the object of the present invention to provide an arrangement for holding a sidewall element on a bodyshell of a vehicle, a bracket and a vehicle, thus enabling the sidewall element to be held on the bodyshell in a particularly advantageous manner.

This object is achieved by a holding arrangement, by a bracket, and by a method, in accordance with the independent claims. Advantageous developments of the invention can be found in the dependent claims.

A first aspect of the invention relates to an arrangement for holding a sidewall element on a bodyshell part of a bodyshell for a vehicle, in particular for a motor car, and very particularly for a passenger car. The bodyshell of the vehicle is also referred to as a superstructure or body and is preferably a self-supporting body which at least partially, in particular at least predominantly or completely, bounds a passenger compartment of the vehicle. In this case, people may be present in the passenger compartment, particularly during a journey of the vehicle. The sidewall element is formed separately from the bodyshell and thus separately from the bodyshell part and—as will be explained in more detail below—is held on the bodyshell part and thus on the bodyshell. For example, the sidewall element, which is also referred to simply as a sidewall, is an outer paneling element, in particular a fender. The outer paneling element forms, for example, at least part of a so-called outer skin of the vehicle, the outer skin of which is the outermost surface of the vehicle. The outer skin can be perceived visually and haptically by persons located in an environment of the vehicle. Thus, for example, at least a partial region of the bodyshell is covered and thus clad by means of the sidewall element.

In the holding arrangement, the sidewall element, which is formed separately from the bodyshell part, is held on the bodyshell part by way of a bracket, which is formed separately from the bodyshell part and separately from the sidewall element. In this arrangement, the bracket is connected to the bodyshell part and to the sidewall element.

In order to be able to hold or mount the sidewall element on the bodyshell in a particularly advantageous manner, it is envisaged according to the invention that the bracket has at least two or precisely two holding elements, which are formed separately from one another and are connected to one another, in particular in a reversibly releasable manner. A first of the holding elements is connected to the bodyshell part, in particular directly and/or in a reversibly releasable manner, whereby the bracket is held, that is to say fastened, on the bodyshell part via the first holding element. The second holding element, which is formed separately from the first holding element, is connected to the first holding element, in particular in a reversibly releasable manner. Furthermore, the second holding element is connected to the sidewall element, in particular in a reversibly releasable manner, whereby the bracket is connected to the sidewall element via the second holding element. Provision is preferably made, in respect of the first holding element and in respect of the second holding element, in particular in respect of all the holding elements, of the bracket, for only the first holding element to be connected, in particular directly, to the bodyshell part. In other words, provision is preferably made for the second holding element to be held on the bodyshell part exclusively by way of the first holding element. Furthermore, provision can preferably be made, in respect of the first holding element and the second holding element, in particular in respect of all the holding elements, of the bracket, for only the second holding element to be connected, in particular directly, to the sidewall element. In other words, provision is preferably made for the first holding element to be held on the sidewall element or to be connected to the sidewall element exclusively by way of the second holding element.

Since the bracket has the holding elements, which are formed separately from one another, as component parts of the bracket, the bracket is of multi-part, in particular two-part, design. As a result of this multi-part design, it is possible, for example, to compensate for installation and component tolerances, in particular of the bodyshell and/or of the sidewall element. As a result, for example, a gap, which is delimited, in the completely produced state of the vehicle, on the one hand by the sidewall element and on the other hand by a further component of the vehicle, which is formed separately from the sidewall element, can be set particularly well in terms of its width, thus enabling a particularly uniform and thus optically appealing gap size or joint pattern of the vehicle to be achieved in a simple and low-cost manner.

It has also proven advantageous if the bracket is designed as a deformation element, also referred to simply as a defo-element, which can be deformed, in particular selectively, in the event of the application of force as a result of an accident, for example, with energy being dissipated. The bracket thus has a dual function since the bracket is used, on the one hand, to retain the sidewall element on the bodyshell. On the other hand, the bracket is used as a deformation element and thus for selective energy dissipation in the event of an accident. Since the bracket is formed separately from the bodyshell part and separately from the sidewall element, it is possible, by simple and thus low-cost variation of the bracket for example, to create, in a particularly simple and low-cost manner, different vehicle derivatives or design variants which have different variants of the bracket but identical sidewall elements and/or identical bodyshell parts, for example. By using the different variants of the bracket in the different vehicle derivatives or design variants of the vehicle, it is possible, for example, to vary a spacing between the sidewall element and the bodyshell, in particular a spacing in the transverse direction of the vehicle. The bodyshell part is therefore, for example, a common member, in particular supporting member, that is to say one which is used for different design variants and can be used in identical form for the vehicle derivatives or design variants. It is also conceivable for the sidewall element to be a common sidewall element, and thus a sidewall element used for different design variants, which is used in identical form for the vehicle derivatives or design variants. The respective bracket, that is to say the respective variant of the respective bracket, is specific to the design variant, so that, for example, a respective, dedicated variant of the bracket is provided for the respective design variant or the respective vehicle derivative.

The variants of the bracket differ, in particular, in their width in the transverse direction of the vehicle, and therefore it is possible to create different widths of the respective vehicle, that is to say different spacings in the transverse direction of the vehicle, between the respective side element and the respective bodyshell part from one vehicle derivative to another or from one design variant to another. For this purpose, only the bracket is varied, that is to say exchanged. Thus, the different vehicle derivatives or variants can be created in a simple and low-cost manner by means of the bracket. Thus, the invention also includes, for example, a modular system which comprises, for example, at least two of the variants of the bracket which are specific to the design variant, the bodyshell part which is used for different design variants and the sidewall element which is used for different design variants, which can be held, that is to say mounted, on the bodyshell part optionally by way of a first of the variants of the bracket and the second variant of the bracket.

The bodyshell part is, for example, a supporting member of a wheel housing of the vehicle, also referred to as a wheel house, and therefore, for example, the bodyshell part at least partially delimits the aforementioned wheel housing in the completely produced state of the vehicle and/or at least one construction element of the vehicle at least partially delimiting the wheel housing is held on the supporting member in the completely produced state of the vehicle. This construction element may be the sidewall element, which is, for example, a fender. In this case, in the completely produced state of the vehicle, a vehicle wheel, also referred to simply as a wheel, of the vehicle is arranged at least partially in the wheel housing. The vehicle wheel is a ground contact element, via which the vehicle is supported or can be supported on a roadway in the vertically downward direction of the vehicle.

In order to be able to compensate for tolerances in a particularly comprehensive manner and in a particularly simple and thus low-cost manner, provision is made in one embodiment of the invention for the second holding element to be connected to the first holding element by means of a connecting device. By means of the connecting device, the second holding element can be fixed to the first holding element in a plurality of positions which differ from one another along the vertical direction of the vehicle and/or the longitudinal direction of the vehicle. In other words, in the course of the mounting of the sidewall element on the bodyshell part, the holding elements are initially not yet fixed to one another, thus allowing the second holding element to be moved in the vertical direction of the vehicle and/or in the longitudinal direction of the vehicle relative to the first holding element into respective positions which differ from one another. Here, the connecting device makes it possible to fix the second holding element to the first holding element in said positions which differ from one another, that is to say to fasten it to the first holding element in such a way that relative movements between the holding elements do not occur. Thus, for example, in the course of assembly, the second holding element is moved into that one of the possible positions which differ from one another in which any tolerances are sufficiently compensated, whereupon the second holding element is fixed to the first holding element in this position.

It is also contemplated for the bracket to be delivered, for example to an assembly belt or to an assembly location at which the sidewall element is mounted, in a state in which the holding elements are already aligned relative to one another and connected to one another, i.e. are fixed to one another. In this state, the bracket is fastened to the bodyshell part and the sidewall element is fastened to the bracket.

To fix the second holding element to the first holding element, the second holding element, for example, is screwed to the first holding element by means of at least one screw-fastening element, in particular by means of at least one screw. Thus, the screw-fastening element, for example, is a component part of the connecting device. Here, the connecting device also comprises, for example, at least one first screw-fastening opening formed on the first holding element and at least one second screw-fastening opening formed on the second holding element, the screw-fastening openings being designed as through-openings, for example. At least one of the screw-fastening openings is designed in such a way, for example, in particular in the longitudinal direction of the vehicle and/or in the vertical direction of the vehicle, or the at least one screw-fastening opening has, for example, such an extent in the vertical direction of the vehicle and/or in the longitudinal direction of the vehicle that—while the screw-fastening element simultaneously engages in the mutually overlapping screw-fastening openings, in particular simultaneously penetrates the mutually overlapping screw-fastening openings—the second holding element can be moved, in particular slid, relative to the first holding element in the longitudinal direction of the vehicle and/or in the vertical direction of the vehicle. Once an advantageous position of the second holding element relative to the first holding element has been established by this movement of the second holding element relative to the first holding element, the second holding element can be fixed to the first holding element in said position by tightening or screwing in the screw-fastening element, whereby the sidewall element is fixed to the bodyshell part, for example in a position or alignment in which the sidewall element has an advantageous alignment with respect to the abovementioned component.

Since the second holding element can be adjusted in the longitudinal direction of the vehicle (x-direction) and/or in the vertical direction of the vehicle (z-direction) with respect to its position relative to the first holding element, the bracket is an adjustable bracket, by means of which tolerances, such as, for example, installation and component tolerances, in particular of the sidewall, can advantageously be compensated.

A further embodiment is distinguished by the fact that the second holding element and the sidewall element each have at least two connecting regions, which are spaced apart from one another and via which the second holding element and the sidewall element are connected to one another. In other words, the two connecting regions of the second holding element are spaced apart from one another, and consequently the two connecting regions of the sidewall element are also spaced apart from one another. The sidewall element can thereby be retained on the bodyshell part in a particularly advantageous manner.

In this case, it has been found to be particularly advantageous if a first of the connecting regions of the second holding element is at least partially overlapped from above in the vertical direction of the vehicle by a first of the connecting regions of the sidewall element, wherein the second connecting region of the second holding element is at least partially overlapped from the front or the rear in the longitudinal direction of the vehicle by the second connecting region of the sidewall element. It is thereby possible to achieve defined, precise and stable mounting of the sidewall element on the bodyshell part via the bracket.

Provision is preferably made for one of the connecting regions of the second holding element or of the sidewall element, in particular the respective first connecting region, to be in the region of a drainage channel or in a drainage channel of the sidewall element, with the result that the multi-part bracket preferably receives the sidewall element near the drainage channel or in the drainage channel. The respective other connecting region of the second holding element or of the sidewall element, in particular the second connecting region of the second holding element or of the sidewall element, is preferably arranged in the region of a joint between the sidewall element and a further add-on part of the vehicle. The joint is, for example, the aforementioned gap, wherein the add-on part is, for example, the aforementioned component. The add-on part is preferably formed separately from the sidewall element, separately from the bracket and separately from the bodyshell part. It is also conceivable for said add-on part to form at least another part of the outer skin of the vehicle. In particular, the add-on part is a bumper covering, by means of which a bending cross-member of the vehicle, for example, is at least partially covered. The other connecting region thus enables a connection between the bracket and the sidewall element in the region of said joint, which is delimited on the one hand by the sidewall element and on the other hand by the add-on part. The joint is, for example, the aforementioned gap. By means of this arrangement of the other connecting region, the joint can be adjusted particularly precisely in a particularly simple manner, particularly in respect of its width.

In particular, provision can be made for the second connecting region of the sidewall element to be arranged on an end of the sidewall element which points forward or rearward in the longitudinal direction of the vehicle.

A further embodiment is distinguished by the fact that the second holding element is connected via one of its connecting regions to the abovementioned bumper covering, which is formed separately from the bracket, separately from the bodyshell part and separately from the sidewall element. The sidewall element can thereby be adjusted in a particularly simple and precise manner relative to the bumper covering.

In a further, particularly advantageous embodiment of the invention, provision is made for the sidewall element to be held on the first holding element exclusively by way of the second holding element. Particularly simple mounting of the sidewall element can thereby be achieved.

In order to be able to achieve a particularly broad scope of functionality in a particularly simple manner, provision is made in a further embodiment of the invention for a buffer element to be held on the bracket, in particular on the first holding element, by means of which buffer element a movement of a front hood of the vehicle, designed, for example, as an engine hood, taking place, in particular, from the top downward in the vertical direction of the vehicle, is held, for example. The buffer element is also referred to as a buffer and has, for example, at least one subregion which is formed from an elastically deformable material and by means of which the movement of the front hood which takes place, in particular, from the top downward in the vertical direction of the vehicle, can be buffered, that is to say mitigated and thus damped. This is advantageous especially if a counterparty in an accident, such as, for example, a pedestrian, strikes the front hood and, in particular, strikes it from the top downward. The movement of the front hood and thus the movement of the pedestrian can be buffered by means of the buffer element in order to protect the pedestrian. The buffer element is therefore also referred to as a pedestrian protection buffer.

In order to achieve particularly advantageous mounting of the sidewall element on the bodyshell part in a particularly simple manner, provision is made in a further embodiment of the invention for the first holding element and/or the second holding element to be of one-piece design.

A second aspect of the invention relates to a bracket for retaining a sidewall element on a bodyshell part of a bodyshell for a vehicle, in particular for a motor car, and very particularly for a passenger car. The bracket according to the second aspect of the invention is used, for example, in the holding arrangement according to the first aspect of the invention. The bracket has at least one first connecting element, by means of which the bracket can be connected or is connected to the bodyshell part, in particular in a reversibly releasable manner. In addition, the bracket has at least one second connecting element, which is spaced apart from the first connecting element and by means of which the bracket can be connected or is connected to the sidewall element, in particular in a reversibly releasable manner. The sidewall element can thereby be held on the bodyshell part by way of the bracket.

In order to be able to retain the sidewall element on the bodyshell part by means of the bracket in a particularly advantageous manner, it is envisaged in the second aspect of the invention that the bracket has a first holding element, which has the first connecting element and can be connected to the bodyshell part by means of the first connecting element, and a second holding element, which is formed separately from the first holding element, has the second connecting element, can be connected to the sidewall element by means of the second connecting element, and is connected to the first holding element, in particular in a reversibly releasable manner. Advantages and advantageous embodiments of the first aspect of the invention are to be regarded as advantages and advantageous embodiments of the second aspect of the invention and vice versa.

A third aspect of the invention relates to a vehicle, in particular a motor car and very particularly a passenger car, which has at least one holding arrangement according to the first aspect of the invention and/or at least one bracket according to the second aspect of the invention. Advantages and advantageous embodiments of the first aspect and of the second aspect of the invention are to be regarded as advantages and advantageous embodiments of the third aspect of the invention and vice versa.

Details of the invention will be found below with reference to the description of the figures and the drawings.

BRIEF DESCRIPTION OF THE DRAWINGS

In the figures, identical or functionally identical elements are provided with the same reference signs.

DETAILED DESCRIPTION OF THE DRAWINGS

Figure 1:
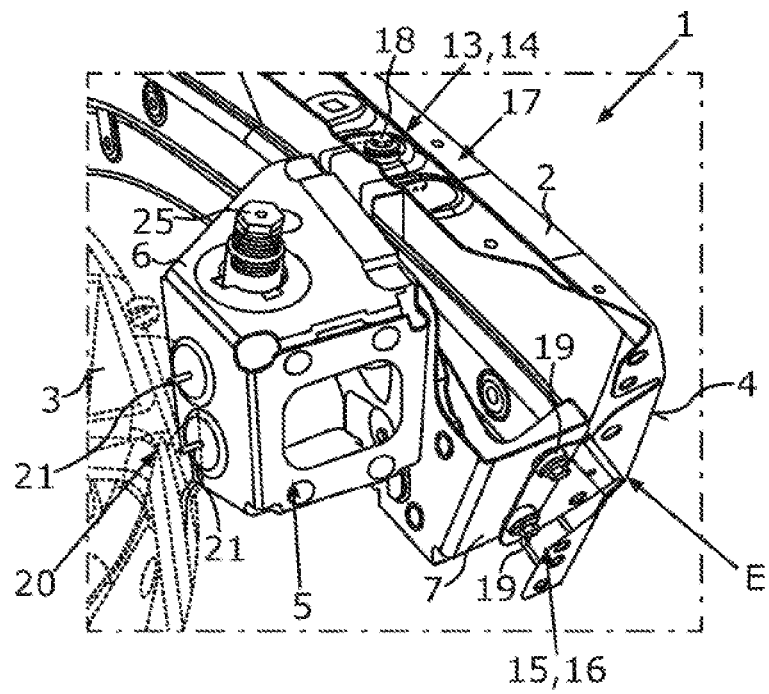
FIG. 1 is a schematic perspective detail view of an arrangement according to an embodiment of the invention for holding a sidewall element on a bodyshell part of a bodyshell for a vehicle designed as a passenger car.

FIG. 1 shows a schematic perspective detail view of an arrangement 1 for holding a sidewall element 2 on a bodyshell part 3 of a bodyshell of a vehicle designed as a passenger car. The bodyshell is also referred to as a superstructure or body and is a self-supporting body of the passenger car. The bodyshell part 3 is, for example, a supporting member of a wheel housing, which can be delimited at least partially by the supporting member, for example. In particular, the bodyshell part 3 can be a fender support, in particular an upper fender support, wherein the sidewall element 2 can be, for example, an outer paneling element and, in this case, in particular, a fender, in particular a front fender. For example, the sidewall element 2 forms at least part of an outer skin of the passenger car, designated by 4 in FIG. 1. Here, the sidewall element 2 is not part of the bodyshell, so that the sidewall element 2 is formed separately from the bodyshell and thus separately from the bodyshell part 3.

In the case of the holding arrangement 1, the sidewall element 2 is held, in particular fixed, on the bodyshell part 3 by way of a bracket 5. Here, the bracket 5 is formed separately from the bodyshell part 3, separately from the bodyshell as a whole and separately from the sidewall element 2. In this case, the bracket 5 is connected, on the one hand, to the bodyshell part 3, in particular in a reversibly releasable manner, and, on the other hand, to the sidewall element 2, in particular in a reversibly releasable manner.

Figure 2:
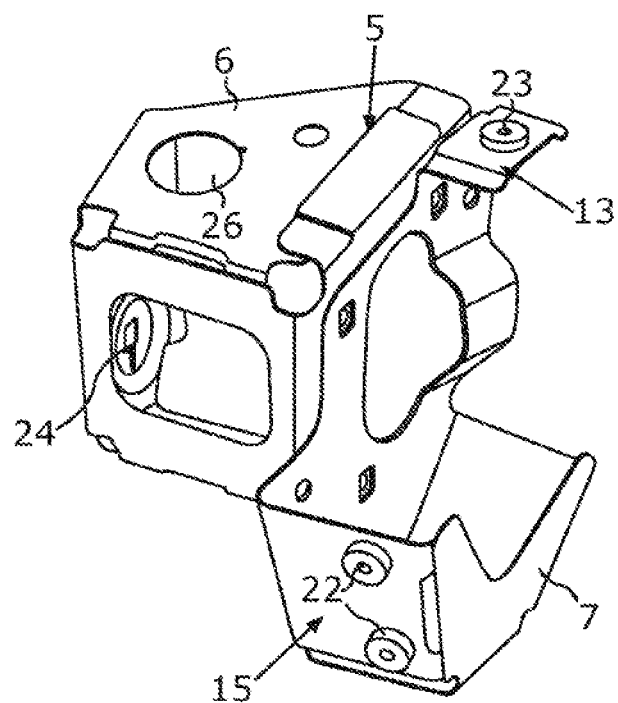
FIG. 2 is a schematic perspective view of a bracket, by way of which the sidewall element is held on the bodyshell part.

In order now to be able to mount, and thus hold or retain, the sidewall element 2 on the bodyshell part 3 in a particularly simple and thus low-cost manner, the bracket 5 has precisely two holding elements 6 and 7, which are formed separately from one another and are connected to one another, in particular in a reversibly releasable manner, as can be seen particularly well in conjunction with FIG. 2. Holding element 6 is connected to the bodyshell part 3, in particular in a reversibly releasable manner. Furthermore, holding element 7 is connected to the sidewall element 2, in particular in a reversibly releasable manner.

Figure 3:
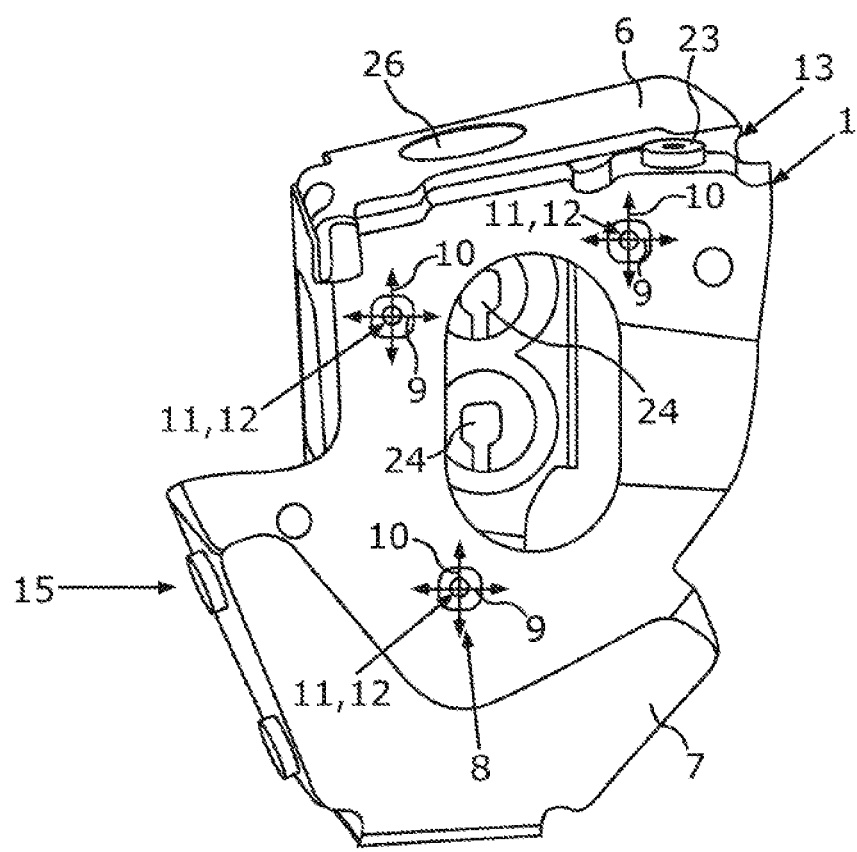
FIG. 3 is a schematic and perspective side view of the bracket.

It is particularly clear from FIG. 3 that the second holding element 7 is connected to the first holding element 6 by means of a connecting device 8, by means of which the second holding element 7 can be fixed to the first holding element 6 in a plurality of positions which differ from one another along the vertical direction of the vehicle and/or the longitudinal direction of the vehicle. FIG. 3 illustrates the longitudinal direction of the vehicle by double arrows 9, the vertical direction of the vehicle being illustrated by double arrows 10. The longitudinal direction of the vehicle is also referred to as the x-direction, the vertical direction of the vehicle also being referred to as the z-direction. It can furthermore be seen from FIG. 3 that the connecting device 8 comprises first screw-fastening openings 11 in holding element 6 and second screw-fastening openings 12 in holding element 7. The respective screw-fastening opening 11 or 12 is designed as a through-opening, wherein the respective screw-fastening opening 11 and the respective screw-fastening opening 12 corresponding thereto overlap or coincide with one another. The respective screw-fastening opening 11 and the respective screw-fastening opening 12 corresponding thereto thus form a pair of screw-fastening openings, for example. The respective pair of screw-fastening openings is assigned, for example, a screw-fastening element, not shown in the figures, which can be designed, in particular, as a screw. In order, for example, to fix holding element 7 to holding element 6, the screw-fastening element is pushed through the associated pair of screw-fastening openings, the screw-fastening openings 11 and 12 of which overlap one another. If the screw-fastening element is then screwed in or tightened, holding element 7 is fixed to holding element 6.

In this case, it is envisaged, for example, that at least one of the screw-fastening openings 11 and 12 of the respective pair of screw-fastening openings has such an extent in the vertical direction of the vehicle and in the longitudinal direction of the vehicle that the respective holding element 6 or 7 having the at least one screw-fastening opening 11 or 12 can be moved, in particular slid, relative to the respective other holding element 7 or 6 in the longitudinal direction of the vehicle and in the vertical direction of the vehicle while the screw-fastening element belonging to the respective pair of screw-fastening openings is engaged in the screw-fastening openings 11 and 12 of the respective pair of screw-fastening openings. By means of this sliding of the respective holding element 6 or 7 relative to the respective other holding element 7 or 6 along the vertical direction of the vehicle and along the longitudinal direction of the vehicle, tolerances can be compensated, for example, thus enabling a particularly advantageous joint pattern of the passenger car to be established in a simple manner.

From FIG. 1 it can be seen that the second holding element 7 and the sidewall element 2 each have at least two connecting regions 13, 14 and 15, 16, which are spaced apart from one another and via which the second holding element 7 and the sidewall element 2 are connected to one another. In this case, the connecting region 14 of the sidewall element 2 is arranged, for example, in the region of or in a drainage channel 17 of the sidewall element 2, with the result that holding element 7 and thus the bracket 5, via its connecting region 13, receives, in particular retains, the sidewall element 2 in the region of or in the drainage channel 17. Connecting region 13 of holding element 7 is also referred to as the first connecting region of holding element 7, and connecting region 14 of the sidewall element 2 is also referred to as the first connecting region of the sidewall element 2. It can be seen from FIG. 1 that connecting region 13 of holding element 7 is covered from above in the vertical direction of the vehicle by connecting region 14 of the sidewall element 2. The connecting regions 13 and 14 and thus holding element 7 and the sidewall element 2 are screwed to one another and thereby connected to one another by means of a screw-fastening element 18, which is designed, in particular, as a screw. In particular, holding element 7 is screwed to or in the drainage channel 17 of the sidewall element 2 via connecting region 13. It is also contemplated for holding element 7 to be screwed to or in the drainage channel 17 of the sidewall element 2 by means of connecting region 15.

Connecting region 15 of holding element 7, also referred to as the second connecting region, is overlapped forwardly in the longitudinal direction of the vehicle by connecting region 14 of the sidewall element 2, also referred to as the second connecting region of the sidewall element 2. In this case, connecting region 16 of the sidewall element 2 is arranged at the end E thereof which points forward in the longitudinal direction of the vehicle. Holding element 7 thus receives the sidewall element 2 at its front tip or in the vicinity of its front tip.

Connecting region 13 of holding element 7 has, for example, at least one first connecting element, by means of which connecting region 13 and thus holding element 7 are connected to the sidewall element 2. The first connecting element is, for example, a screw-fastening opening, designed in particular as a through-opening, into which the screw-fastening element 18 engages in order in this way to screw holding element 7 to the sidewall element 2 by means of the first connecting element and by means of the screw-fastening element 18, and thereby connect it thereto.

Connecting region 15 is connected to connecting region 16 by means of two screw-fastening elements 19, which are designed, for example, as screws.

In particular, for each screw-fastening element 19, connecting region 15 of holding element 7 has a second connecting element, by means of which connecting region 15 is connected to connecting region 16 and holding element 7 is thereby connected to the sidewall element 2. The respective second connecting element is, for example, a second screw-fastening opening, designed in particular as a second through-opening, into which, for example, the respective screw-fastening element 19 engages. Thus, connecting region 15 is screwed and thus connected to connecting region 16 and thus to the sidewall element 2 by means of the second connecting elements.

Holding element 6 has a third connecting region 20, via which holding element 6 and thus the bracket 5 as a whole are connected to the bodyshell part 3. In this case, connecting region 20 and thus holding element 6 are screwed and thereby connected to the bodyshell part 3 by means of respective screw-fastening elements 21, which are designed, for example, as screws. In this case, for example, connecting region 20, in particular for each screw-fastening element 21, has at least one third connecting element, by means of which holding element 6 is connected to the bodyshell part 3. The third connecting element is, for example, a third screw-fastening opening, designed in particular as a third through-opening, into which the respective screw-fastening element 21 engages. Thus, for example, holding element 6 is screwed and thereby connected to the bodyshell part 3 by means of the third connecting element. It can be seen from FIG. 1 that connecting region 20 is spaced apart from connecting regions 13 and 15 of the bracket 5.

Provision can also be made for the second holding element 7 and thus the bracket 5 as a whole to be connected via connecting region 15 and, in this case, for example, by means of the second connecting elements, to a bumper covering (not illustrated in the figures), which is formed separately from the bracket 5, separately from the bodyshell part 3 and separately from the sidewall element 2. In particular, holding element 7 can be screwed to the bumper covering via connecting region 15.

The respective second connecting element of connecting region 15, which connecting element is designed, for example, as a screw-fastening opening, in particular as a through-opening, or has such a screw-fastening opening, in particular designed as a through-opening, can be seen from FIG. 2 and is designated there by 22. The first connecting element of connecting element 13, which connecting element is designed, for example, as a screw-fastening opening, in particular as a through-opening, or has such a screw-fastening opening, in particular designed as a through-opening, can likewise be seen in FIG. 2 and is designated there by 23. The respective third connecting element of connecting region 20, which connecting element is designed, for example, as a screw-fastening opening, in particular as a through-opening, or has such a screw-fastening opening, in particular designed as a through-opening, can be seen, for example, in FIG. 3 and is designated there by 24.

In the present case, the screw-fastening opening in connecting element 22 is formed or delimited by a nut of connecting element 22, which nut is designed, for example, as a press-fit or weld nut and is formed, for example, separately from a main body of holding element 7 and is fastened to the main body, for example by welding and/or press-fitting. Connecting element 22 has a thread, which is arranged in the screw-fastening opening of connecting element 22 and into which the screw-fastening element 19 is screwed, thereby fastening the sidewall element 2 to the bracket 5. The same can be applied to screw-fastening opening 23. It is thus contemplated that the screw-fastening opening in connecting element 23 is formed or delimited by a nut of connecting element 23, which nut is designed, for example, as a press-fit or weld nut and is formed, for example, separately from the main body of holding element 7 and is fastened to the main body, for example by welding and/or press-fitting. Connecting element 23 has a thread, which is arranged in the screw-fastening opening of connecting element 23 and into which the screw-fastening element 18 is screwed, thereby fastening the sidewall element 2 to the bracket 5.

The through-opening in connecting element 24 is preferably threadless, and therefore no thread is arranged in the through-opening in connecting element 24. Alternatively or additionally, the through-opening in connecting element 24 is, for example, a rectangular hole. In this case, for example, a thread, into which the respective screw-fastening element 21 is screwed, is provided on the bodyshell part 3 for each screw-fastening element 21 which passes through the respective through-opening in connecting element 24, thereby fastening the bracket 5 to the bodyshell part 3.

In addition, provision is made for a buffer element 25 to be held on the bracket 5, in particular on holding element 6, by means of which buffer element a movement of a front hood, in particular designed as an engine hood, of the passenger car which takes place, in particular, from the top downward in the vertical direction of the vehicle, can be buffered, that is to say damped. For this purpose, holding element 6 has a fourth connecting element 26 (FIG. 2), which is designed as a through-opening and by means of which the buffer element 25 is held on holding element 6 and thereby on the bracket 5, in particular in a reversibly releasable manner. In its front region, for example, the passenger car has a receiving space, which is arranged outside a vehicle passenger compartment delimited by the body and is delimited at least partially by the bodyshell part 3 toward the outside in the transverse direction of the vehicle. The receiving space is, for example, an engine compartment, in which, for example, at least one or precisely one drive motor for driving the passenger car can be received. The drive motor can be an internal combustion engine or an electric machine. The front hood is now held on the bodyshell so as to be pivotable relative to the bodyshell about a pivot axis running in the transverse direction of the vehicle and can be pivoted relative to the bodyshell between at least one open position and one closed position. In the closed position, at least a partial region of the receiving space is covered from above by the front hood in the vertical direction of the vehicle and is thus closed. In the open position, the front hood exposes the partial region of the receiving space, in particular in the upward direction in the vertical direction of the vehicle. If, for example, there is now a frontal collision, in the course of which a counterparty in the accident, such as a pedestrian, strikes the closed front hood, that is to say the front hood in its closed position, then there is, for example, an accident-induced downward displacement of at least part of the front hood. This accident-induced displacement of the front hood is a movement of the front hood, it being possible for this movement and, as a result, also the pedestrian or their movement to be damped. It is thereby possible to protect the pedestrian, and therefore the buffer element 25 is also referred to as a pedestrian protection buffer. In this case, connecting element 26 is, for example, a receiving hole, in which the buffer element 25 is at least partially received.

LIST OF REFERENCE SIGNS 1 holding arrangement
2 sidewall element
3 bodyshell part
4 outer skin
5 bracket
6 holding element
7 holding element
8 connecting device
9 double arrow
10 double arrow
11 screw-fastening opening
12 screw-fastening opening
13 connecting region
14 connecting region
15 connecting region
16 connecting region
17 drainage channel
18 screw-fastening element
19 screw-fastening element
20 connecting region
21 screw-fastening element
22 connecting element
23 connecting element
24 connecting element
25 buffer element
26 connecting element

The invention claimed is:

1. An arrangement for holding a sidewall element on a bodyshell part of a bodyshell for a vehicle, comprising:
 a bracket by which the sidewall element is held on the bodyshell part, wherein
  the bracket is formed separately from the bodyshell part and separately from the sidewall element, and is connected to the bodyshell part and to the sidewall element,
  the bracket comprises a first holding element, which is connected to the bodyshell part, and a second holding element, which is formed separately from the first holding element, is connected to the first holding element, and is connected to the sidewall element,
  wherein the second holding element and the sidewall element each have at least two connecting regions, which are spaced apart from one another and via which the second holding element and the sidewall element are connected to one another,
  wherein a first of the at least two connecting regions of the second holding element is at least partially overlapped from above in a vertical direction of the vehicle by a first of the at least two connecting regions of the sidewall element, and
  wherein the second connecting region of the second holding element is at least partially overlapped from a front or a rear in a longitudinal direction of the vehicle by the second connecting region of the sidewall element.

2. The arrangement according to claim 1, wherein
 the second holding element is connected to the first holding element via a connecting device, by which connecting device the second holding element is fixable to the first holding element in a plurality of positions which differ from one another along a vertical direction of the vehicle and/or a longitudinal direction of the vehicle.

3. The arrangement according to claim 1, wherein
 the second holding element is connected via one of its connecting regions to a bumper covering, which is formed separately from the bracket, separately from the bodyshell part and separately from the sidewall element.

4. The arrangement according to claim 1, wherein
 the sidewall element is held on the first holding element exclusively by way of the second holding element.

5. The arrangement according to claim 1, wherein
 a buffer element for buffering a movement of a front hood of the vehicle is held on the bracket.

6. The arrangement according to claim 5, wherein
 the buffer element is held on the first holding element.

7. The arrangement according to claim 1, wherein
 the first holding element and/or the second holding element are of one-piece design.

8. A bracket for retaining a sidewall element on a bodyshell part of a bodyshell for a vehicle, comprising:
 at least one first connecting element, by which the bracket is connectable to the bodyshell part; and
 at least one second connecting element, which is spaced apart from the first connecting element and by which the bracket is connectable to the sidewall element, thereby enabling the sidewall element to be held on the bodyshell part by way of the bracket,
 wherein
 the bracket has a first holding element, which has the at least one first connecting element and is connectable to the bodyshell part by the at least one first connecting element, and a second holding element, which is formed separately from the first holding element, has the at least one second connecting element, is connectable to the sidewall element by the at least one second connecting element and is connected to the first holding element,
 the second holding element has at least two connecting regions, which are spaced apart from one another and via which the second holding element and the sidewall element are connectable to one another,
 a first of the at least two connecting regions of the second holding element is arranged to be at least partially overlapped from above in a vertical direction of the vehicle by a first of at least two connecting regions of the sidewall element, and
 the second connecting region of the second holding element is arranged to be at least partially overlapped from a front or a rear in a longitudinal direction of the vehicle by a second connecting region of the sidewall element.

9. A vehicle, comprising:
 a bodyshell having a bodyshell part;
 a sidewall element; and
 a bracket according to claim 8.

* * * * *